(12) United States Patent
Bielass

(10) Patent No.: US 8,544,816 B2
(45) Date of Patent: Oct. 1, 2013

(54) VALVE WITH LIP SEAL

(75) Inventor: Ekkehard Bielass, Dresden (DE)

(73) Assignee: A. Kayser Automotive Systems GmbH (DE)

( * ) Notice: Subject to any disclaimer, the term of this patent is extended or adjusted under 35 U.S.C. 154(b) by 660 days.

(21) Appl. No.: 12/352,338

(22) Filed: Jan. 12, 2009

(65) Prior Publication Data
US 2009/0183510 A1 Jul. 23, 2009

(30) Foreign Application Priority Data
Jan. 18, 2008 (DE) .................. 10 2008 005 088

(51) Int. Cl.
*F16K 31/06* (2006.01)
(52) U.S. Cl.
USPC ........................ 251/50; 251/129.15
(58) Field of Classification Search
USPC ............. 251/50, 284, 52, 129.15; 277/349, 277/351, 402, 347, 348; 417/283, 306, 407, 417/440
See application file for complete search history.

(56) References Cited

U.S. PATENT DOCUMENTS

| | | | | |
|---|---|---|---|---|
| 2,179,165 A | * | 11/1939 | Sifkovitz | 251/88 |
| 2,678,187 A | * | 5/1954 | Peters | 251/357 |
| 2,959,392 A | * | 11/1960 | Von Platen et al. | 251/332 |
| 4,129,144 A | * | 12/1978 | Andersson et al. | 137/541 |
| 4,420,010 A | * | 12/1983 | Becker et al. | 137/115.21 |
| 4,682,759 A | * | 7/1987 | Hall et al. | 251/210 |
| 4,724,868 A | * | 2/1988 | Kasugai et al. | 137/516.29 |

FOREIGN PATENT DOCUMENTS
WO WO2006029814 * 3/2006

* cited by examiner

*Primary Examiner* — John Rivell
*Assistant Examiner* — Jonathan Waddy
(74) *Attorney, Agent, or Firm* — Gerald E. Hespos; Michael J. Porco; Matthew T. Hespos

(57) ABSTRACT

The invention relates to a valve having a movably arranged valve body for selectively opening and closing a valve passage, with a sealing element, for example a lip seal, being arranged on the valve body in such a way that the sealing element comes to bear against a valve seat if the valve body is moved in a closing direction, and with at least one outer peripheral section of the sealing element being resiliently movable or elastically and/or flexibly deformable substantially in the movement direction of the valve body, and with a protective collar being arranged radially outside the outer peripheral section of the sealing element, which protective collar is fixed to the valve body in order to protect the sealing element from damage and/or from excessive deformation.

17 Claims, 6 Drawing Sheets

VALVE WITH LIP SEAL

This application claims the priority benefit of pending German application No. 10 2008 005 088.1-12, filed Jan. 18, 2008, the disclosure of which is included in its entirety herein.

The present invention relates to a valve having an elastic and/or flexible sealing element, such as for example a lip seal, or having a movably arranged sealing element.

Lip seals are sealing elements which can be elastically and/or plastically deformed in order to ensure sealing of a valve passage independently of length tolerances or of other tolerances of a valve seat and/or valve body. Lip seals of said type are therefore composed, for example, of a thin sheet of rubber, silicone or the like which can be elastically and/or plastically deformed in order to nestle against a valve seat.

Patent document DE 10 2004 044 439 B4 discloses for example a valve of said type having a lip seal. As shown in FIGS. 5 and 6, in said valve which is disclosed in the above-cited patent document, a lip seal 4 is inserted into a groove 3C of a valve body 3 and seals off against an annular axial surface of a housing element 21 when the valve body 3 is in the closed position. In the open position of the valve body 3, the lip seal 4 lifts up from the axial contact surface of the housing element 21 and firstly opens a radial gap between the sealing element 4 and the housing element 21 in order to connect a valve inner space to a space situated below the lip seal 4. Furthermore, the lip seal 4 is not inserted into the groove 3C in a sealing fashion. This means that, when the valve body 3 is open, the valve inner space is also connected a valve outer space by means of a gap (not shown) between the lip seal 4 and groove side walls 3C2, 3C3, and a gap between the lip seal 4 and a groove base 3C1 of the groove 3C.

On account of the flow of a fluid firstly through the gap between the lip seal 4 and the housing element 21 and through the gap between the lip seal 4 and the groove side walls 3C2, 3C3 and between the lip seal 4 and the groove base 3C1 of the groove 3C, a dynamic pressure change is generated in order to exert a force on the lip seal 4. In this way, a higher pressure prevails at the groove base 3C1 than at an outer periphery of the lip seal 4, in order to press or inflate the lip seal 4 radially outwards.

Furthermore, for example on account of the Bernoulli effect in the very small gap between the lip seal 4 and the housing element 21, a dynamic pressure drop is generated in order to pull the sealing element 4 in the direction of the housing element 21. On account of the elastic and/or plastic deformability of the lip seal 4, a corresponding deformation takes place on account of the pressure change.

As a result of the deformation of the lip seal 4, it may be the case that an outer peripheral section of the lip seal 4 comes to bear against the housing element 21 in such a way as to rub against the housing element 21 during the movement of the valve body 3. Such a state is however undesirable since the friction of the lip seal 4 against the housing element 21 firstly leads to wear of the lip seal 4, and abrasion of the lip seal 4 can contaminate the valves. Furthermore, the friction of the lip seal 4 against the housing element 21 hinders the movement of the valve body 3, in such a way that the switching time of the valve is lengthened overall or a shift process is possibly even prevented entirely.

Furthermore, if the valve disclosed in patent document DE 10 2004 044 493 B4 is designed as an insert-type valve, in which a seal 3A seals off against a sealing seat of a housing when the valve is inserted into the corresponding housing, there is also the following problem. Since the valve seat against which the seal 3A comes to bear during operation is not a part of the insert-type valve, but rather a part of a component which is separate from the valve, the sealing element 3A cannot be supported against the sealing seat when the valve is dismounted.

Accordingly, the valve body 3 is pressed by the spring 10 with such an intensity that deformation of the sealing element 4 occurs. In the event of the valve being stored outside the housing for a relatively long period of time, such as for example in a spare parts store, this can result in the lip seal 4 being plastically and/or permanently deformed in such a way that the functionality of the valve after assembly is adversely affected. There is therefore a requirement for the lip seal 4 to be protected from undesired deformation.

It is the object of the invention to create a valve which avoids the disadvantages of the prior art. It is intended in particular to create a valve with a lip seal, in which the function of the lip seal is improved.

Said object is achieved by means of a valve having a movably arranged valve body for selectively opening and closing a valve passage, with a sealing element being arranged on the valve body in such a way that the sealing element comes to bear against a valve seat if the valve body is moved in a closing direction, and with at least one outer peripheral section of the sealing element being resiliently movable or elastically and/or flexibly deformable substantially in the movement direction of the valve body, and with a protective collar being arranged radially outside the outer peripheral section of the sealing element, which protective collar is fixed to the valve body.

The protective collar which is arranged radially outside the outer peripheral section of the sealing element limits a deformation of the sealing element in the radially outward direction, and prevents the outer peripheral section of the sealing element from rubbing against a housing element, which is arranged radially outside the sealing element, when the valve body is moved axially in order to open or close the valve. Since the protective collar is fixed to the valve body, the protective collar moves together with the sealing element. There is therefore no friction of the outer peripheral section of the sealing element even if the outer peripheral section bears against the protective collar, since the protective collar moves together with the sealing element during the opening and closing of the valve.

The protective collar preferably has a piston skirt which is inserted in a sliding fashion into a cylinder. Here, the cylinder is preferably arranged so as to be substantially stationary or immovable. The cylinder may for example be fixedly connected to a valve housing, or the cylinder may be arranged in a section of the valve housing itself.

By virtue of the protective collar being formed in the manner of a piston with a piston skirt, it is possible for the protective collar to slide easily within the cylinder with low friction during an opening and closing movement of the valve body. Friction resistance is thereby minimized, thereby ensuring fast switching of the valve and also minimizing friction abrasion, such that contamination of the valve on account of abrasion is prevented. The piston skirt may have a sleeve shape without recesses at the periphery, though it is also possible for recesses such as for example slots or openings to be arranged in the piston skirt. A sleeve shape without a recess offers the advantage of precise guidance of the protective collar within the cylinder. On the other hand, recesses such as slots and openings in the piston skirt offer the advantage of a reduction in the moving masses. Depending on the application, use is therefore made of a piston skirt with or without recesses.

The sealing element is preferably produced as a lip seal from rubber with a Shore A hardness of 40 to 70, most preferably with a Shore A hardness of 50 to 60. Here, the lip seal is preferably in the form of a sheet with a thickness of 0.3 to 2 mm, ideally in the range from 0.5 to 1 mm.

The outer peripheral section of the sealing element is preferably elastically deformable or resiliently movable in a range from 0.1 to 1 mm, preferably in a range from 0.3 to 0.5 mm.

Rubber has proven to be highly suitable for the production of the lip seal, in particular with a Shore A hardness of 40 to 70. Such rubber firstly has a sufficient degree of elasticity to provide tolerance compensation in length, that is to say in the axial direction of the valve body, for example in a range from 0.3 to 0.5 mm, and secondly sufficient dimensional stability, preferably on account of corresponding elasticity and/or inherent shape memory properties, to re-assume the original shape after a deformation when a deformation force is removed.

The protective collar is preferably extended in such a way that its end serves as a stop which interacts with a stop element, which is arranged so as to be immovable, in order to limit a deformation and/or movement of the outer peripheral section of the sealing element.

The interaction of a stop which is arranged on the valve body with a stop element which is arranged on a housing element or the like limits a movement of the valve body if the valve is for example designed as an insert-type valve and the valve is not yet installed in the housing provided for it. In this way, it is possible to prevent an excessive deformation of the lip seal or of the sealing element during the storage of the valve for the purpose of spare parts storage. This offers the advantage that the lip seal or the sealing element has the correct, functional shape immediately after the installation of the valve, so as to be immediately usable. In contrast, according to the prior art, it was in part necessary to wait for a relatively long period of time, which could last several days, until the sealing element had re-assumed the correct shape to nestle against the sealing seat.

The object is also achieved by means of a valve, in particular having the above-specified features, having a movably arranged valve body for selectively opening and closing a valve passage, with a sealing element being arranged on the valve body in such a way that the sealing element comes to bear against a valve seat if the valve body is moved in a closing direction, and with at least one outer peripheral section of the sealing element being resiliently movable or elastically and/or flexibly deformable substantially in the movement direction of the valve body, and with a stop being provided on the valve body, which stop interacts with a stop element, which is arranged so as to be immovable, in order to limit a deformation and/or movement of the outer peripheral section of the sealing element.

A further sealing element is preferably arranged on the valve body in order to form a double seat valve.

The valve is preferably designed as an insert-type valve which is to be inserted into a housing (formed separately from the valve) and which, by means of a flange with a seal or O-ring, seals off an inner space of the housing.

A further valve seat is preferably arranged in the housing, which further valve seat interacts with the further sealing element.

The valve body is preferably guided in the valve in such a way that an axis of the valve body can be pivoted with respect to an axis of an actuator by a predefined angle in order to compensate production and installation tolerances, such that uniform contact of the further sealing element of the valve body against the valve seat of the housing is ensured.

The above-described valve is preferably used for discharging a charge pressure of a turbocharger, that is to say said valve is installed in the charging circuit of a turbocharger of an internal combustion engine.

Furthermore, the above-specified object is achieved by means of a turbocharger having a valve of said type for discharging a charge pressure.

The above object is also achieved by means of an internal combustion engine having a turbocharger and having a valve of said type, in which, in response to a throttle flap closing signal, the valve is opened in order to discharge the charge pressure into the intake system upstream of the turbocharger. An advantageous response behaviour of the internal combustion engine is attained by virtue of the valve opening very quickly when a throttle flap closing signal is received, and accordingly discharging the charge pressure very quickly.

The invention will now be explained in more detail on the basis of an exemplary embodiment in connection with the appended drawings.

Below, with reference to FIGS. 1 to 4, a description is given of an electromagnetic 2/2 directional control valve (valve with two ports and two switching positions) of the type which is closed in the currentless state, which valve is designed as a so-called insert-type valve, as a preferred exemplary embodiment. The invention is however not restricted to such a design of a valve. The invention may also be applied to other types of valves, such as for example a non-return valve, which is controlled by means of a differential pressure between an inlet and an outlet and which, when a predefined differential pressure is attained, opens in a flow direction, while a flow of the fluid in the opposite flow direction is not permitted. Accordingly, the present invention can also be applied to a so-called differential pressure regulator which is of identical design to a non-return valve and which can regulate or control a differential pressure between two pressure sections or pressure chambers. Differential pressure regulators of said type are used for example in fuel supply systems of motor vehicles to regulate a fuel injection pressure relative to an ambient pressure. Furthermore, the valve according to the invention may also be used for a pressure regulator which can for example regulate or control a pressure in a tank.

Accordingly, the term "valve" is to be understood to mean a component with a passage which can be controlled or regulated by a valve body, such as for example a differential pressure regulator, a pressure regulator, a non-return valve, a solenoid valve, a manually-actuated valve, a pneumatically or hydraulically actuated valve or the like.

The electromagnetically actuated solenoid valve shown in FIGS. 1 to 4 has, inter alia, a valve according to the invention with a lip seal. Depending on the position of a valve body 103 which is movable in an axial direction, an outer peripheral section 104A of a sealing element 104 or of a lip seal seals off a passage of the valve by bearing against a valve seat 122, or opens said passage when the valve body 103 is moved upwards as viewed in FIG. 1.

Figure 4:
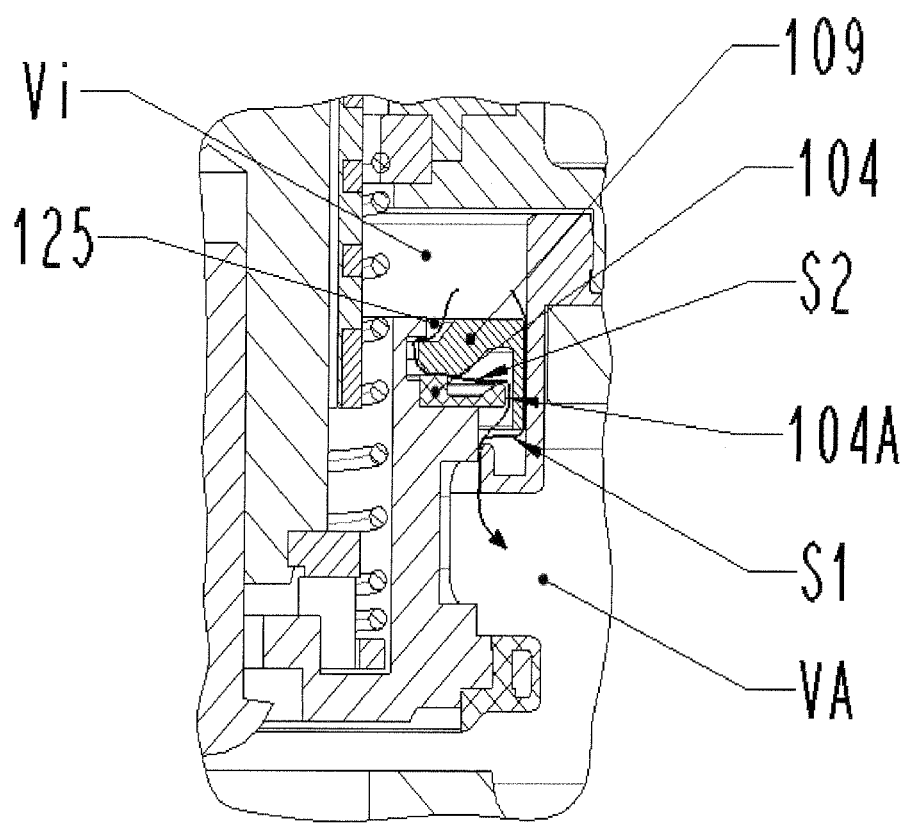
FIG. 4 shows the same detailed view as FIG. 2, but with a flow path of a fluid from the valve inner space into a valve outer space via the lip seal being indicated.
Figure 5:
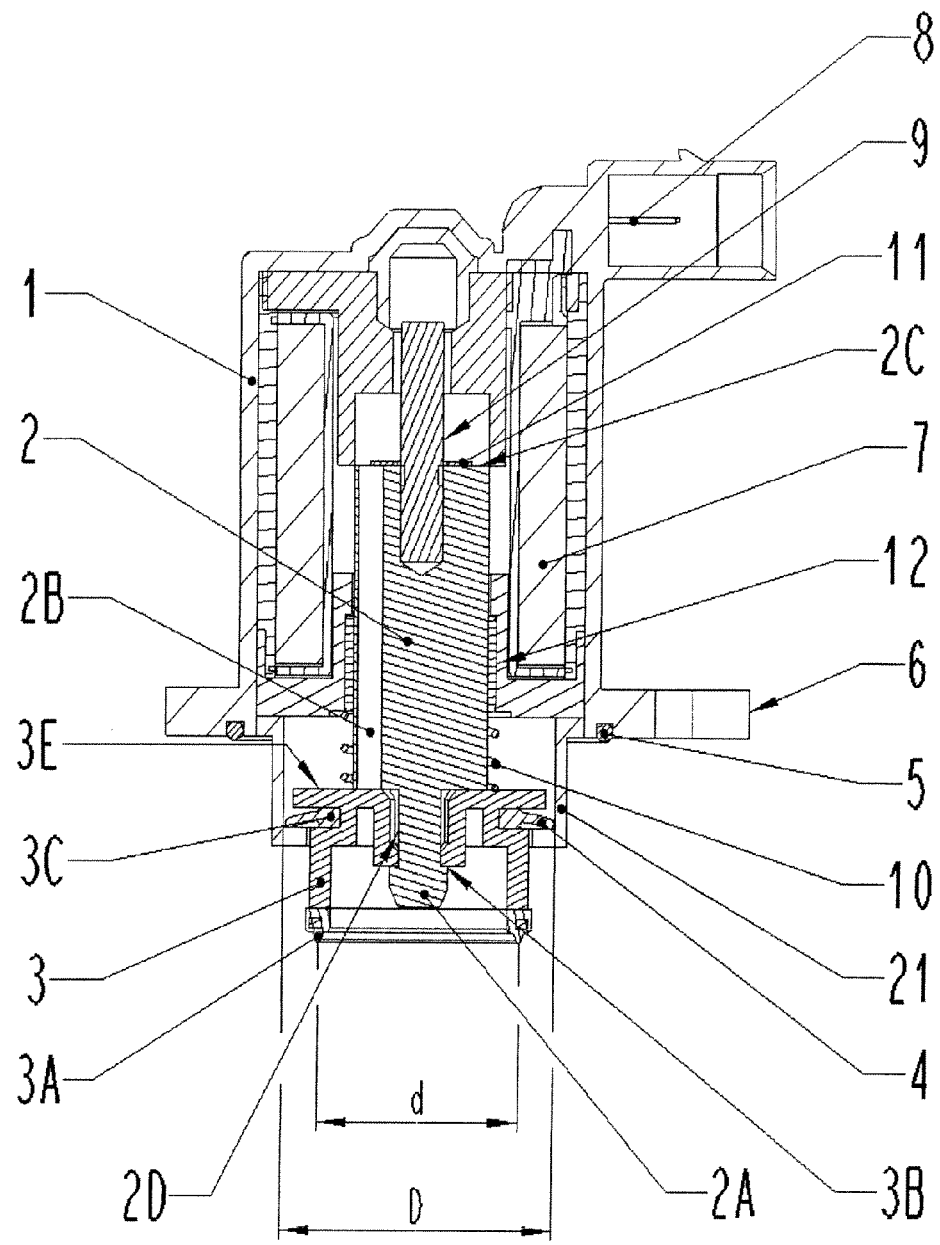
FIG. 5 shows a conventional valve with a lip seal.
Figure 6:
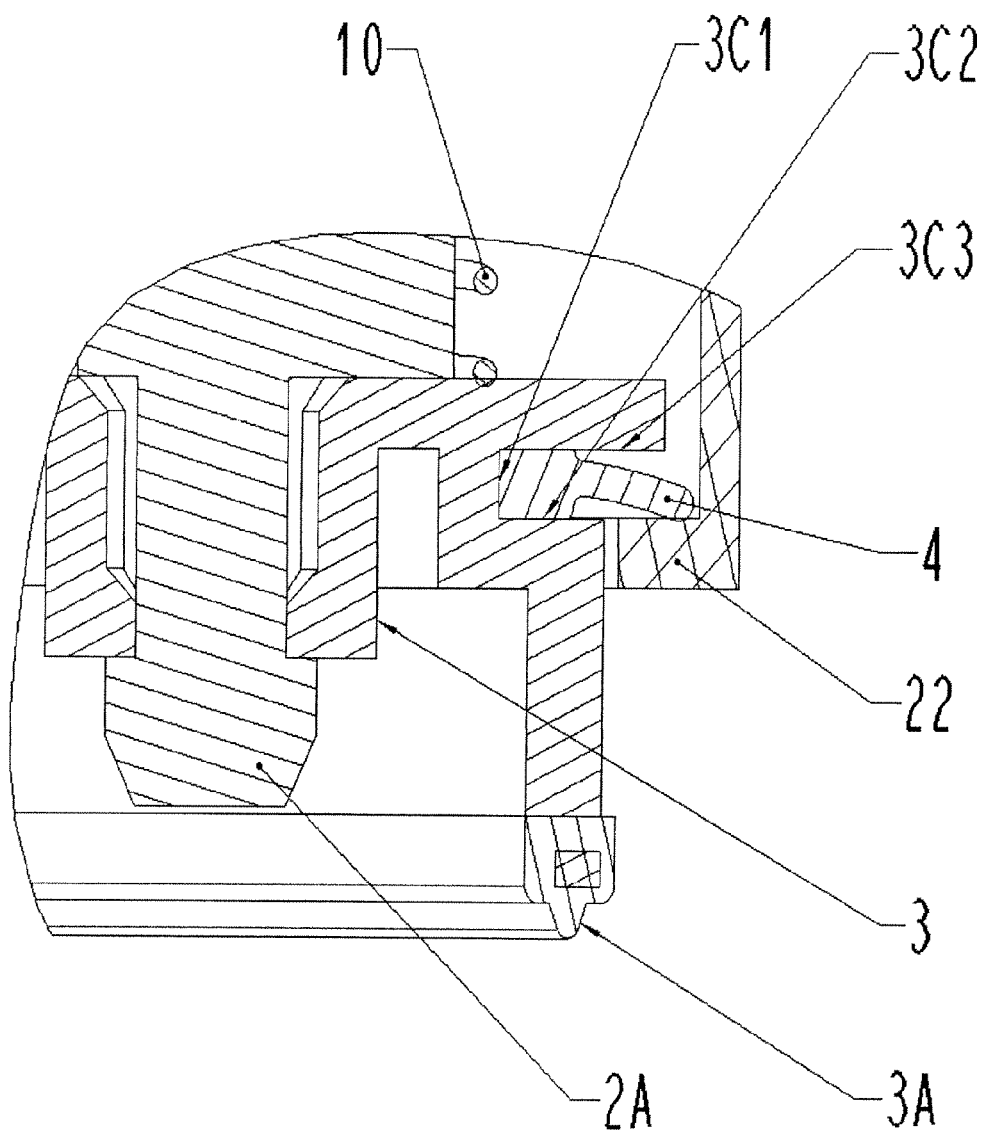
FIG. 6 shows a detailed view of the conventional valve from FIG. 5.

The flow of the fluid through the opened passage is shown in particular in the detailed view in FIG. 4. In said FIG. 4, the outer peripheral section 104A of the sealing element 104 is lifted up from the valve seat 122 in order to open a corresponding passage. Here, it should be noted that the fluid can pass from the valve inner space Vi through a gap (not shown) between elements 109 and 121 (described later), as shown by an arrow S1.

Alternatively or in addition, the fluid can pass from the valve inner space Vi through a gap (not shown) between elements 109 and 125 (described later) and through a gap (not shown) between an element 109 (described later) and the sealing element 104, as shown by an arrow S2.

Figure 1:
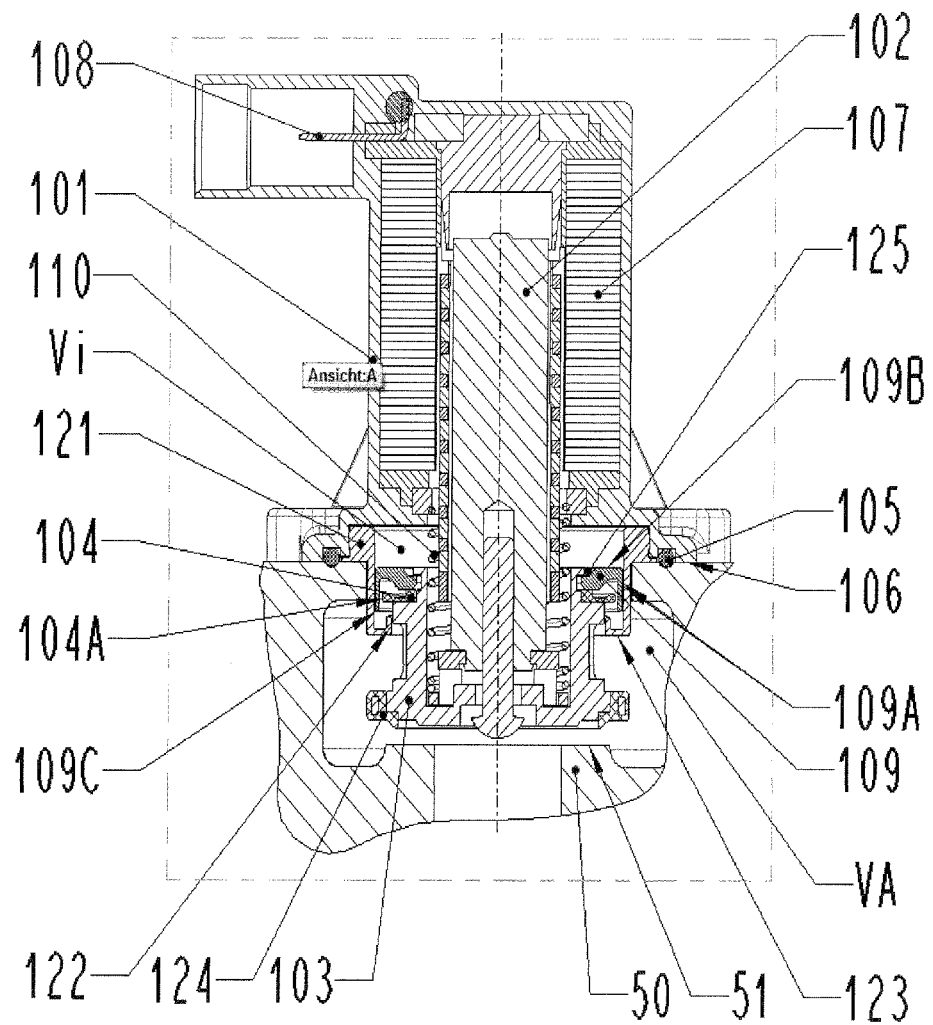
FIG. 1 shows a valve with a lip seal according to the invention in section, when the valve is designed, for example, as a double-seat valve and is inserted into a housing which is separate from the valve, with the housing having the valve seat for a further sealing element of the double-seat valve.

When the valve body 103 is moved downwards in FIG. 1, the outer peripheral section 104A of the sealing element 104 is placed in contact against the valve seat 122 in order to provide sealing there between the valve inner space Vi and the valve outer space Va. The sealing element 104 is designed as a so-called lip seal which is formed substantially from a thin sheet with a thickness of 0.3 to 2 mm, ideally in the range between 0.5 and 1 mm, and from a suitable material such as for example rubber or silicone or the like. A lip seal composed of rubber preferably has a Shore A hardness of 40 to 70, ideally in the range from 50 to 60 Shore A.

Figure 3:
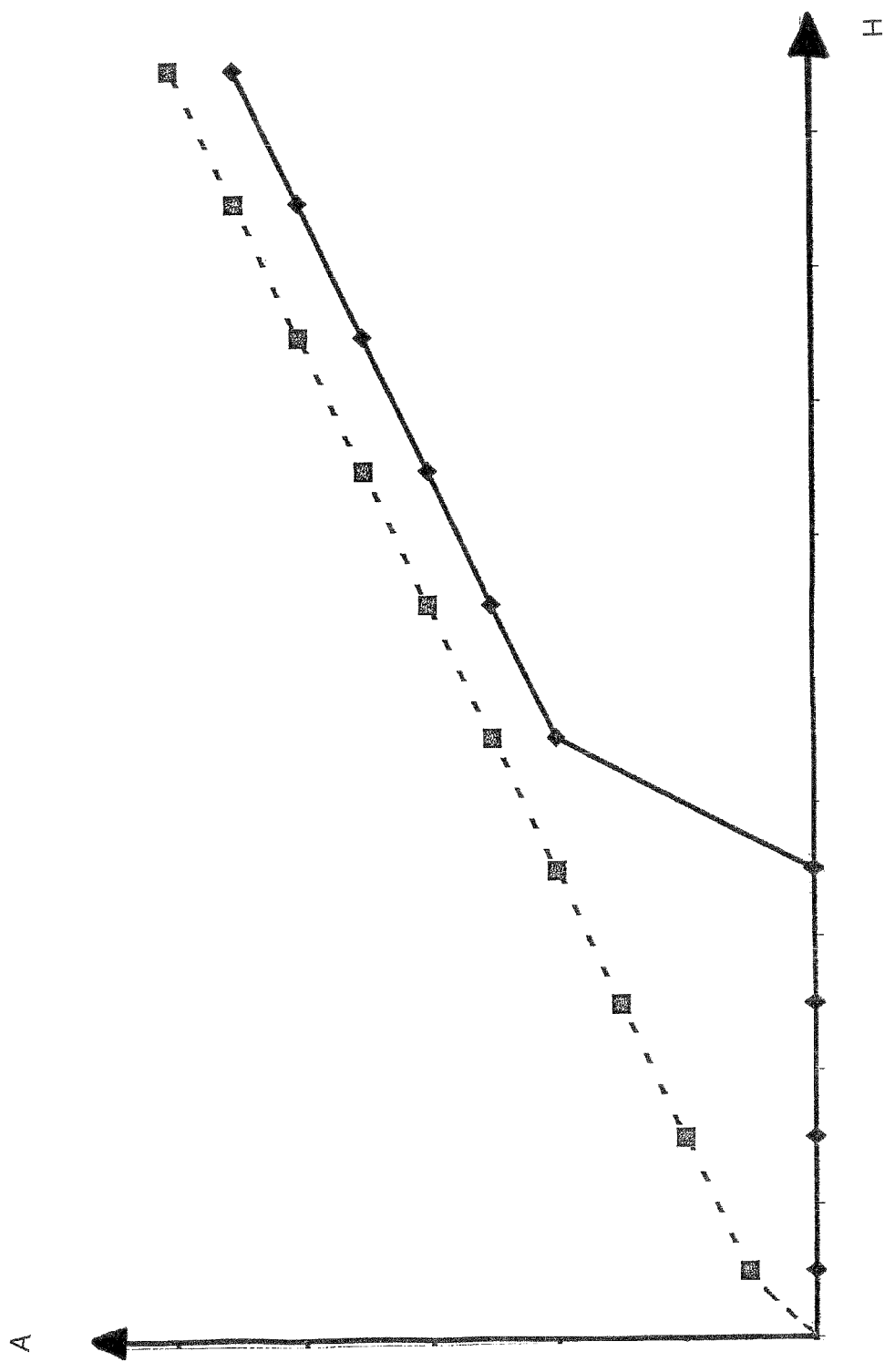
FIG. 3 shows a comparison of the passage cross section opened by an only slightly elastic sealing element in relation to that opened by the lip seal.

Such a thin sheet of rubber, silicone or the like has a corresponding degree of flexibility, such that it remains closed over a relatively large range of a lower position (in FIG. 1) of the valve body 103, that is to say in a closed position or in a closing region of the valve body 103. This property of the lip seal shall be explained in more detail in particular with reference to FIG. 3. In FIG. 3, a valve lift H of a valve body 103 is plotted on the horizontal axis and an opened passage cross section A is plotted on the vertical axis. As shown by the dashed line in FIG. 3, in the case of a conventional, substantially rigid sealing element of a valve body, an opened passage cross section of the valve increases substantially linearly or proportionally as a function of the valve lift.

In contrast, the lip seal 104 has the characteristic shown by the solid line in FIG. 3. As the valve body 103 lifts up, the lip seal 104 initially remains closed over a relatively large lift range of the valve body 103 on account of the higher pressure in the valve inner space Vi than in the valve outer space Va and on account of the flexibility of the outer peripheral section 104A of the lip seal 104. When a predefined lift of the valve body 103 is reached, the lip seal 104 opens on account of the outer peripheral section 104A lifting up from the valve seat 122, and said lip seal 104 springs back substantially into its original shape on account of its elasticity, or returns to the original shape on account of its shape memory properties, in order to generate a sudden steep rise in the opened passage cross section over a relatively small lift, and in order, later, after the lip seal 104 has re-assumed the original shape, to have a similar linear rise of the opened passage cross section to that of a conventional seal which is less elastic or barely elastic.

Said characteristic of a lip seal 104 may be used for different applications. It is for example possible in this way to generate corresponding dead-time regulation of a differential pressure regulator or of a pressure regulator, or corresponding hysteresis in a regulating circuit. In the exemplary embodiment shown here, said characteristic is however used for a double-seat valve in order to compensate production tolerances.

Figure 2:
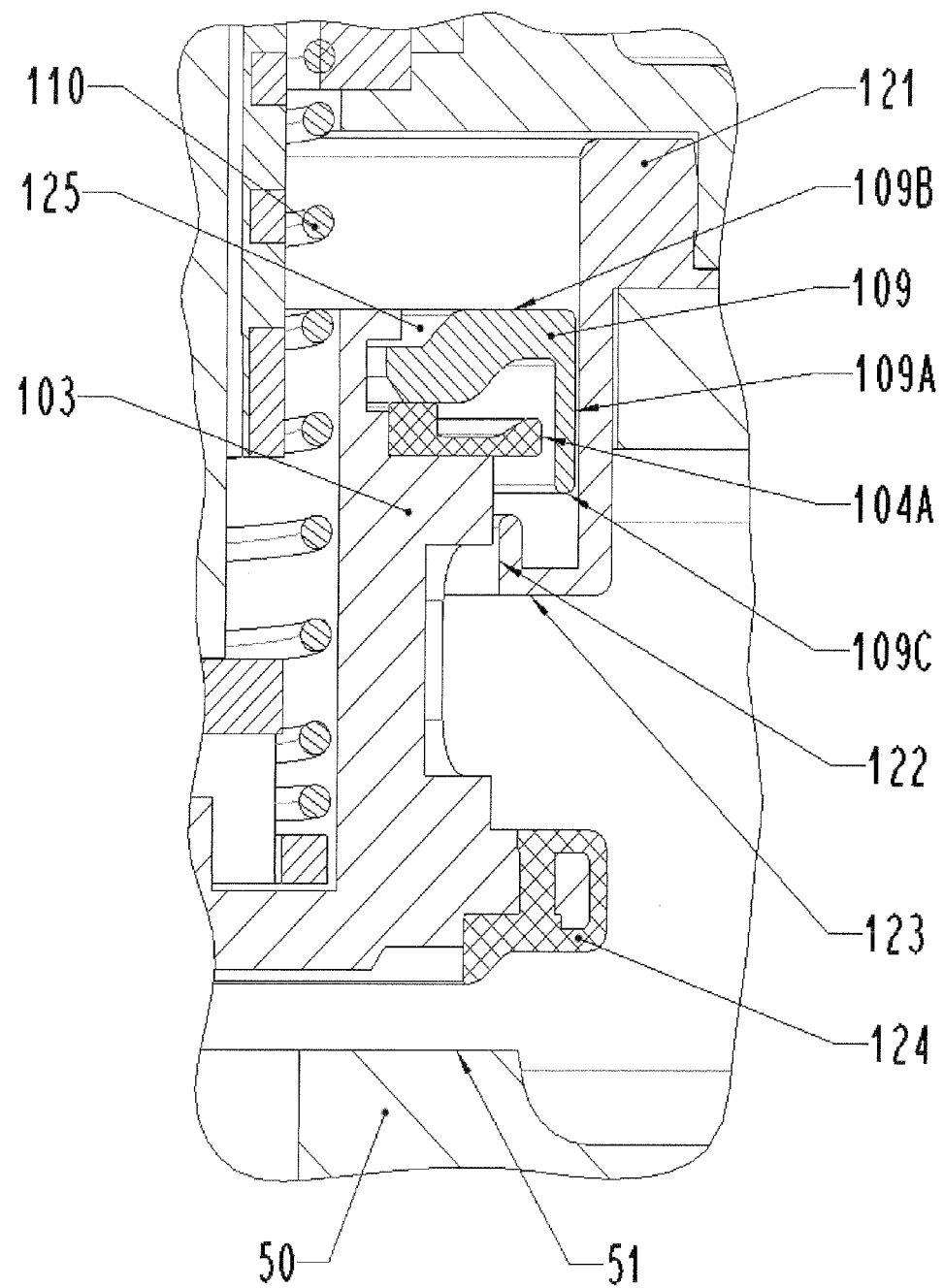
FIG. 2 shows a detailed view of the lip seal of the valve according to FIG. 1.

In a double-seat valve of said type, as shown in FIGS. 1, 2 and 4, a further sealing element 124 is attached to the same valve body 103 as that to which the lip seal 104 is also attached. If the two sealing elements 104 and 124 in the double-seat valve shown were substantially rigid sealing elements, on account of production tolerances, only one sealing element would close completely and the other sealing element would remain open. More precisely, if, on account of production tolerances, a spacing between the sealing contact surfaces of the two sealing elements 104, 124 were greater than a spacing of the sealing contact surfaces of the two valve seats 122, 51, the valve body 103 would, during its downward movement, be stopped as the sealing element 124 came to bear against the valve seat 51. On account of the spacing of the sealing contact surfaces of the sealing elements 104, 124 being greater than the spacing of the corresponding valve seats 51, 122, and on account of the rigid design of the sealing elements 104, 124, the upper sealing element 104 would remain slightly open, in such a way as to leave an open passage.

In the reverse situation, if the spacing of the valve seats 51, 122 were slightly greater than the spacing of the contact surfaces of the sealing elements 104, 124, during the downwards movement of the valve body 103, the sealing element 104 would come to bear against the valve seat 122, in such a way as to stop the downwards movement of the valve body 103. On account of the spacing of the valve seats 51, 122 being greater than the slightly smaller spacing of the contact surfaces of the sealing elements 104, 124, in this case, the sealing element 124 would remain slightly open, in such a way as to leave an open passage. On account of production tolerances, it is practically impossible to make the spacing of the valve seats 51, 122 exactly identical to the spacing of the sealing surfaces of the sealing elements 104, 124. Therefore, in the case of a substantially rigid seal of the sealing elements 104, 124, one of the two valve passages would always remain open. Such a case is undesirable in the case of a double-seat valve of said type.

With the elastically deformable lip seal 104, said problem can be solved in a simple manner. Here, the spacing of the contact surfaces of the sealing element 104 from the contact surface of the sealing element 124 is set to be slightly smaller than the spacing of the contact surfaces of the valve seats 51, 122. Therefore, during a closing process of the valve body 103, the lip seal 104 is placed in contact against the valve seat 122 when the sealing element 124 is not yet completely closed. On account of the deformability of the lip seal 104, however, the valve body 103 can be moved downwards further, until the sealing element 124 is placed in sealing contact against the valve seat 51.

Furthermore, a protective collar 109 is attached to the valve body 103, which protective collar 109 is fixed to the valve body 103 and moves together with the movement of the valve body 103 and protects the lip seal 104. When the valve is opened, a fluid flows out of the valve inner space Vi, as described above, through gaps between a securing ring 125 and the protective collar 109 (the gaps are not shown in the figures) and gaps between the protective collar 109 and the lip seal 104. On account of said flow of the fluid, a slightly greater pressure prevails at an inner diameter of the lip seal 104 than acts at an outer diameter of the lip seal 104. On account of said pressure difference, the lip seal 104 is expanded radially in such a way as to be pressed radially outward with an outer peripheral section 104A. The protective collar 109 has a section which is designed as a piston skirt 109A and against which, in this case, the outer peripheral section 104A of the sealing element 104 comes into contact.

Since the protective collar 109 together with its piston skirt 109A is moved, like the sealing element 104, together with the valve body 103, the contact of the outer peripheral section 104A of the lip seal 104 against the piston skirt 109A of the protective collar 109 does not generate any friction when the valve body 103 is moved. Accordingly, damage to or wear of the lip seal 104 is prevented. Furthermore, no abrasion is generated, such that the valve inner space is not contaminated.

The piston skirt 109A is preferably inserted into a cylinder 121 of the valve in such a way as to ensure that the valve body 103 slides within the valve with low friction. A corresponding friction pairing is selected between the piston skirt 109A and the cylinder 121, such as for example a Teflon component against a plastic component composed of, for example, polyamide PA or polyphenylene sulphide PPS or a Teflon-coated component or the like. It is however also possible to use any other low-friction plastic for sliding against another plastic component. A valve is therefore created which prevents friction of a lip seal 104 against an outer wall on account of the inflation of the lip seal 104 in the radial direction. Accordingly, the valve can switch very quickly because no undesirable increased friction resistance is generated.

Furthermore, a stop 109C is provided in the lip valve for engaging with a stop element 123. The engagement between the stop 109C and the stop element 123 limits a maximum deformation of the outer peripheral section 104A of the lip seal 104. When the lip seal 104 is used in the insert-type double-seat valve shown in the exemplary embodiment, therefore, when the valve is dismounted, that is to say when the valve is not installed in a housing 50 with a valve seat 51, a closing movement of the valve body 103 on account of a spring 110 which is arranged in the valve is limited as a result of the stop 109C coming into contact with the stop element 123. An excessive inadmissible deformation of the lip seal 104 can be prevented in this way.

In contrast, if said lip seal 104 were to be excessively deformed without the stop 109C coming to bear against the stop 123, this could in other respects lead to a case in which, after the installation of the insert-type valve into the housing 50 with the valve seat 51, the lip seal 104 stands upright in the upwards direction on account of the excessive deformation, that is to say a permanent residual deformation is generated in the lip seal. This could lead to the lip seal 104 no longer resting correctly on the valve seat 122 in the installed state, in such a way that the valve passage is only incompletely closed.

This case is prevented by the provision of the stop 109C on the stop element 123. Accordingly, when the stop 109C bears against the stop element 123 (in the dismounted state of the insert-type double-seat valve of the exemplary embodiment shown), the outer peripheral section 104A of the lip seal 104 is deformed upwards by a maximum of one millimetre, preferably in a range of only 0.3 to 0.5 mm. In this way, after the installation of the insert-type valve and corresponding lifting of the valve body 103 as a result of the engagement of the sealing element 124 on the valve seat 51 which is provided in the housing 50, the lip seal 104 can be elastically restored, in such a way as to bear against the valve seat 122 in the closed state of the valve.

The stop 109C is preferably formed as an end section of the piston skirt 109A of the protective collar 109. The stop 109C may however also be formed separately from the protective collar 109.

The protective collar 109 also has a piston head 109B in order to fix the piston skirt 109A, which is inserted in a slidable fashion into the cylinder 121, to the valve body 103. The fixing takes place preferably together with the lip seal 104 by means of a securing ring 125 which is inserted into a groove of the valve body 103. The present invention is however not restricted to such a type of fixing of the lip seal 104 and of the protective collar 109. It is rather possible to use any other known fixing method, such as for example adhesive bonding, a screw connection, a plug-type connection, a snap-action connection or the like.

Although not shown in the figures, the piston head 109B may also have passage openings in order, by means of corresponding dimensioning of the passage openings, to create a fluid passage in addition or alternatively to the gap between the securing ring 125 and the piston head 109B of the protective collar 109. It is possible for a flow resistance between the valve inner space Vi and the valve outer space Va to be adapted to the corresponding application conditions by forming said passage openings in the piston head 109B or dimensioning or omitting the passage openings.

Furthermore, a lower surface of the piston head 109B of the protective collar may have radial grooves in order to protective collar 109. This also has the advantage that a pressure gradient, that is to say a pressure difference at the lip seal 104 is reduced, in such a way that an inflation of the lip seal 104 is minimized. In other words, an elastic deformation of the lip seal 104 in a radial direction in the direction of the piston skirt 109A is reduced by reducing the pressure difference between an inner periphery of the lip seal 104 and an outer periphery of the lip seal 104.

The valve shown in FIG. 1 preferably also has a substantially cylindrical housing 101 with a cylindrical coil 107 which is supplied with power by means of an electrical connection 108. Arranged within the cylindrical coil 107 is a magnet armature 102 which, in response to a supply of power to the electrical coil 107, is pulled upwards as viewed in FIG. 1, in such a way that said magnet armature 102 pulls the valve body 103, which is fastened to its lower end, upwards with it.

The magnet armature 102 is guided within the housing 101 preferably by means of a Teflon-coated bearing shell, composed preferably of a magnetic material, for example iron. Use is preferably made of a coil body as described in patent application DE 10 2005 000 985 A1. More preferably, is provided a spacer (not shown) for the magnet armature 102, as described in patent document DE 10 2004 044 439 B4, the spacer of which is incorporated by reference. Said spacer serves to ensure an air gap between the magnet armature 102 and an upper stop surface of the magnet armature 102, in order to break the magnetic circuit at this point when the magnet armature 102 is purged upwards. In this way, an excessive adherence or adhesion of the magnet armature 102 in its upper attracted position is prevented, such that reliable closure of the valve when the power supply to the coil 107 is interrupted is ensured.

Closure of the valve is obtained by means of a spring 110 when a power supply to the coil 107 is interrupted.

The valve body 103 is preferably produced from plastic. Polyamide 6.6 with a glass fibre component of 10 to 50%, preferably 30%, is particularly suitable for this purpose in order to obtain a sufficient strength of the valve body 103. The valve body 103 may however also be produced from some other suitable plastic. A sealing element 124 is arranged on an end side of the valve body 103, which sealing element 124 is produced from an elastomer and may be fused to the valve body 103. Said sealing element 124 comes into engagement with a sealing seat 51 which is arranged for example in a turbocharger housing 50. The entire valve is inserted by means of a flange 106 into the (turbocharger) housing 50 and is secured on the latter preferably by means of screws. A seal, preferably an O-ring 105, is arranged on an end side of the flange 106 for sealing.

Alternatively, however, it is possible to use a rubber moulded part (not shown), as described in patent document DE 10 2004 044 439 B4. Said rubber moulded part offers the advantage that it simultaneously seals off the flange 106 with respect to the turbocharger housing 50 and the valve housing 101 with respect to a housing element 21.

The invention has been explained on the basis of an exemplary embodiment. In the exemplary embodiment, the lip seal 104 is formed as a thin flexible sheet composed of rubber, silicone of the like. Said lip seal 104 is preferably designed to be deformable in an elastically restoring fashion. The lip seal 104 may however also be designed so as to generate a permanent plastic deformation of the sheet in order to correspondingly adapt the valve properties to the application conditions.

Furthermore, instead of a deformable thin sheet, it is possible, as a lip seal 104, to use a substantially rigid seal if the latter is attached to the valve body 103 for example by means of a spring. A substantially rigid sealing element which is arranged in a resilient fashion in this way may perform the same function as the thin deformable sheet of the lip seal 104.

The piston skirt 109A of the protective collar 109 preferably has a sleeve shape without passages or recesses or slots.

The invention is not restricted to the exemplary embodiment of a so-called insert-type double-seat valve shown here. The lip seal 104 with protective collar 109 may likewise be used in any other type of valve, such as for example a non-return valve, a differential pressure regulator, a pressure regulator, a multi-way valve, a manually actuated valve or the like.

LIST OF REFERENCE SYMBOLS

1 Valve housing
2 Magnet armature
2A Thickened portion
2B Passage duct
2C Axial end side
2D Section with small diameter
3 Valve body
3A Seal
3B Latching lug
3C Groove
3C1 Groove base
3C2 Groove side wall
3C3 Groove side wall
3D End side
3E Rear side
4 Seal
5 O-ring
6 Flange
7 Magnet coil
8 Electrical connection
9 Pin
10 Spring
11 Spacer
12 Bearing shell
21 Housing element
22 Valve seat
50 Turbocharger housing
51 Valve seat
101 Valve housing
102 Magnet armature
103 Valve body
104 Sealing element
104A Outer peripheral section
105 O-ring
106 Flange
107 Magnet coil
108 Electrical connection
109 Protective collar
109A Piston skirt
109B Piston head
109C Stop
110 Spring
121 Cylinder
122 Valve seat
123 Stop element
124 Sealing element
125 Securing ring
Vi Valve inner space
Va Valve outer space

The invention claimed is:

1. A valve comprising a housing with a valve passage extending through the housing, the valve further having a valve body movable along a movement direction relative to the housing for selectively opening and closing the valve passage, a first sealing element arranged on the valve body and movable into abutment with a first valve seat if the valve body is moved in a closing direction, at least one outer peripheral section of the first sealing element being resiliently movable or elastically deformable substantially in the movement direction of the valve body, and a protective collar fixed to the valve body and having a piston skirt arranged radially outside of the peripheral section of the first sealing element and projecting beyond the first sealing element in the closing direction and with all of the first sealing element being radially inward of the piston skirt, the piston skirt being slidable within the housing and a second sealing element arranged on the valve body and movable into abutment with a second valve seat if the valve body is moved in the closing direction.

2. The valve according to claim 1, further comprising a cylinder formed separately from the housing and disposed in the housing, a stop element disposed immovably on the cylinder, the piston skirt being disposed in a sliding fashion in the cylinder and an end of the piston skirt in the closing direction being engageable with the stop element of the cylinder to limit movement in the closing direction, the first valve seat being formed on the cylinder inward of the stop element to limit deformation and/or movement of the outer peripheral section of the first sealing element.

3. The valve according to claim 1, with the first sealing element being produced as a lip seal from rubber with a Shore A hardness of 40 to 70.

4. The valve according to claim 1, wherein the outer peripheral section of the first sealing element being elastically deformable or resiliently movable in a range of 0.1 to 1 mm.

5. The valve according to claim 1 wherein the second sealing element is arranged on an end of the valve body in the closing direction.

6. The valve according to claim 1, with the valve being designed as an insert-type valve which is to be inserted into the housing and which, by means of a flange with a seal or O-ring, seals off an inner space of the housing.

7. An internal combustion engine having a turbocharger and having a valve according to claim 1, in which internal combustion engine, in response to a throttle valve closing signal, opens the valve in order to discharge the valve pressure into the intake system upstream of the turbocharger.

8. The valve according to claim 1 wherein a gap is formed between the first sealing element and the protective collar so as to form a fluid passage.

9. A valve, comprising: a housing including a valve passage extending through the housing, a cylinder formed separately from the valve housing and disposed in the valve passage, a stop element disposed immovably on the cylinder and a valve seat formed on the stop element of the cylinder, a valve body movable along a movement axis relative to the housing and the cylinder for selectively opening and closing the valve passage, a sealing element projecting out from the valve body transverse to the movement axis in such a way that the sealing element abuts on the valve seat of the cylinder if the valve body is moved in a closing direction, at least one outer peripheral section of the sealing element being resiliently movable or elastically deformable substantially in the movement direction of the valve body, a further sealing element being arranged on an end of the valve body in the closing direction and being spaced from the sealing element to form a double seat valve, a further valve seat being arranged in the housing at a location spaced from the cylinder, which further valve seat interacts with the further sealing element, a protective collar mounted on the valve body for movement with the valve body, a piston skirt extending from the protective collar and disposed between the sealing element and the cylinder in directions transverse to the moving direction and an end of the piston skirt projecting beyond the sealing element in the closing direction to define a stop that interacts with the stop element of the cylinder to limit a deformation and/or movement of the outer peripheral section of the sealing element, wherein a distance between a sealing surface of the sealing element and a sealing surface of the further sealing element is less than a distance between the valve seat and the further valve seat.

10. The valve according to claim 9, wherein the valve being designed as an insert-type valve which is to be inserted into the housing and which, by means of a flange with a seal or O-ring, seals off an inner space of the housing.

11. The valve according to claim 9, with the valve body being guided in the valve in such a way that an axis of the valve body is pivotable with respect to an axis of an actuator by a predefined angle in order to compensate production and installation tolerances, such that uniform contact of the further sealing element of the valve body against the valve seat of the housing is ensured.

12. The valve according to claim 9 being disposed in a turbocharger.

13. The valve according to claim 9 wherein the piston skirt is disposed to prevent sliding frictional engagement between the sealing element and the housing as the valve body moves along the movement axis.

14. A valve comprising:
a housing including a valve passage extending through the housing, a cylinder formed separately from the valve housing and disposed in the valve passage, a stop element disposed immovably on the cylinder and a valve seat formed on the stop element of the cylinder, a valve body movable along a movement axis relative to the housing and the cylinder for selectively opening and closing the valve passage, a sealing element projecting out from the valve body transverse to the movement axis in such a way that the sealing element abuts on the valve seat of the cylinder if the valve body is moved in a closing direction, at least one outer peripheral section of the sealing element being resiliently movable or elastically deformable substantially in the movement direction of the valve body, a further sealing element being arranged on an end of the valve body in the closing direction and being spaced from the sealing element to form a double seat valve, a further valve seat being arranged in the housing at a location spaced from the cylinder, which further valve seat interacts with the further sealing element, a protective collar mounted on the valve body for movement with the valve body, a piston skirt extending from the protective collar and disposed between the sealing element and the cylinder in directions transverse to the moving direction and an end of the piston skirt projecting beyond the sealing element in the closing direction to define a stop that interacts with the stop element of the cylinder to limit a deformation and/or movement of the outer peripheral section of the sealing element, wherein the cylinder surrounds the piston skirt through all ranges of movement of the valve body, the stop element defining an inward projection on the cylinder and the valve seat projecting from the stop element in an opening direction of the valve body.

15. The valve according to claim 14, wherein a distance between a sealing surface of the sealing element and a sealing surface of the further sealing element is less than a distance between the valve seat and the further valve seat.

16. The valve according to claim 14, wherein the stop defined on the piston skirt engages the stop element between the cylinder and the valve seat.

17. A valve, comprising: a housing including a cylinder, a valve body movable along a movement axis relative to the housing and the cylinder for selectively opening and closing a valve passage, a sealing element projecting out from the valve body transverse to the movement axis in such a way that the sealing element abuts on a valve seat if the valve body is moved in a closing direction, at least one outer peripheral section of the sealing element being resiliently movable or elastically deformable substantially in the movement direction of the valve body, a protective collar mounted on the valve body for movement with the valve body, a piston skirt extending from the protective collar and disposed between the sealing element and the cylinder in directions transverse to the moving direction and an end of the piston skirt projecting beyond the sealing element in the closing direction to define a stop that interacts with a stop element disposed immovably on the cylinder to limit a deformation and/or movement of the outer peripheral section of the sealing element, wherein the outer peripheral section of the sealing element is spaced inwardly from an inner peripheral surface of the piston skirt in an unbiased condition of the sealing element, and wherein the sealing element is expandable radially outward in response to pressure in the valve so that the outer peripheral section of the sealing element contacts the inner peripheral surface of the piston skirt.

\* \* \* \* \*